United States Patent [19]

Scarborough, Jr.

[11] 4,281,353

[45] Jul. 28, 1981

[54] APPARATUS FOR PROJECTING ENLARGED VIDEO IMAGES

[76] Inventor: Bifford L. Scarborough, Jr., 604 JFK Ct., Suffolk, Va. 23434

[21] Appl. No.: 3,037

[22] Filed: Jan. 12, 1979

[51] Int. Cl.³ .............................................. H04N 5/64
[52] U.S. Cl. .................................. 358/254; 358/238; 312/7 TV; 353/74
[58] Field of Search ...................... 358/254, 237, 238; 353/50, 71, 74, 77; 312/7 TV

[56] References Cited

U.S. PATENT DOCUMENTS

| | | | |
|---|---|---|---|
| 2,285,509 | 6/1942 | Goshaw | 358/254 |
| 2,543,561 | 2/1951 | Tracy | 353/78 |
| 3,036,154 | 5/1962 | Harman | 358/254 |
| 3,820,995 | 6/1974 | Miller | 430/336 |
| 4,021,108 | 5/1977 | Schubach | 358/254 |

OTHER PUBLICATIONS

Norelco, "Here's Norelco Protelgram", 1948, North American Phillips Co. Inc.

Primary Examiner—Robert L. Griffin
Assistant Examiner—Edward L. Coles

[57] ABSTRACT

An apparatus is provided for receiving the inverted video image of a television set and for enlarging and projecting this image onto a suitable display surface. An adjustable concave mirror, located at a distance from the television set which is dependent upon the size of the enlarged image which is desired, is enclosed in a housing which shields the projected image from being washed out. The housing has a non-reflecting black matte interior finish and an opening through which the image is projected towards the display surface.

3 Claims, 3 Drawing Figures

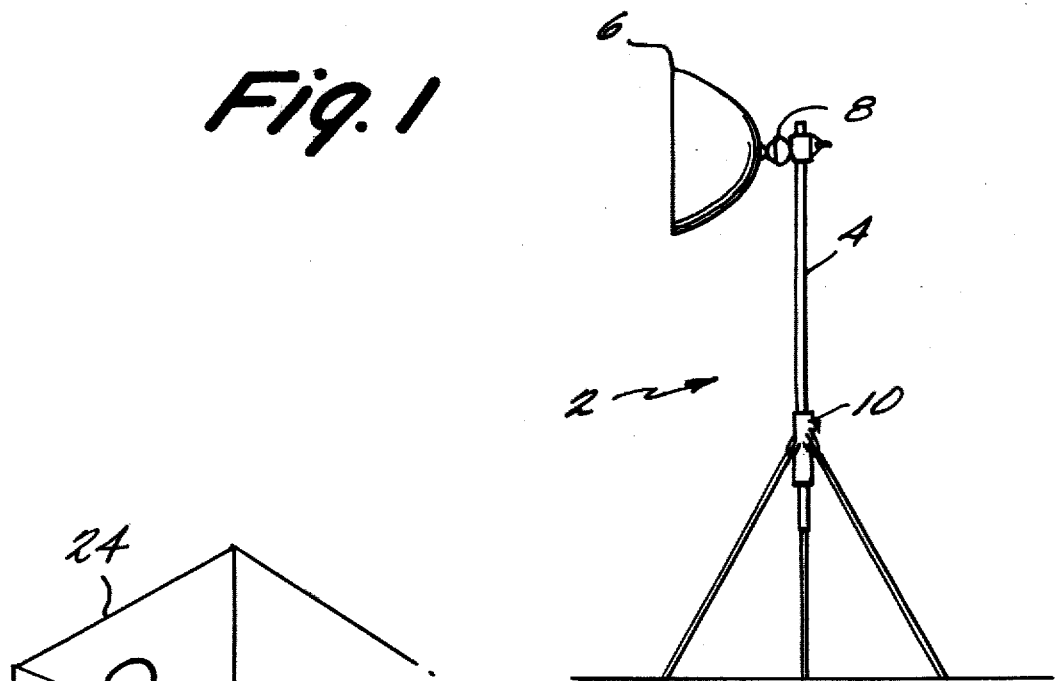
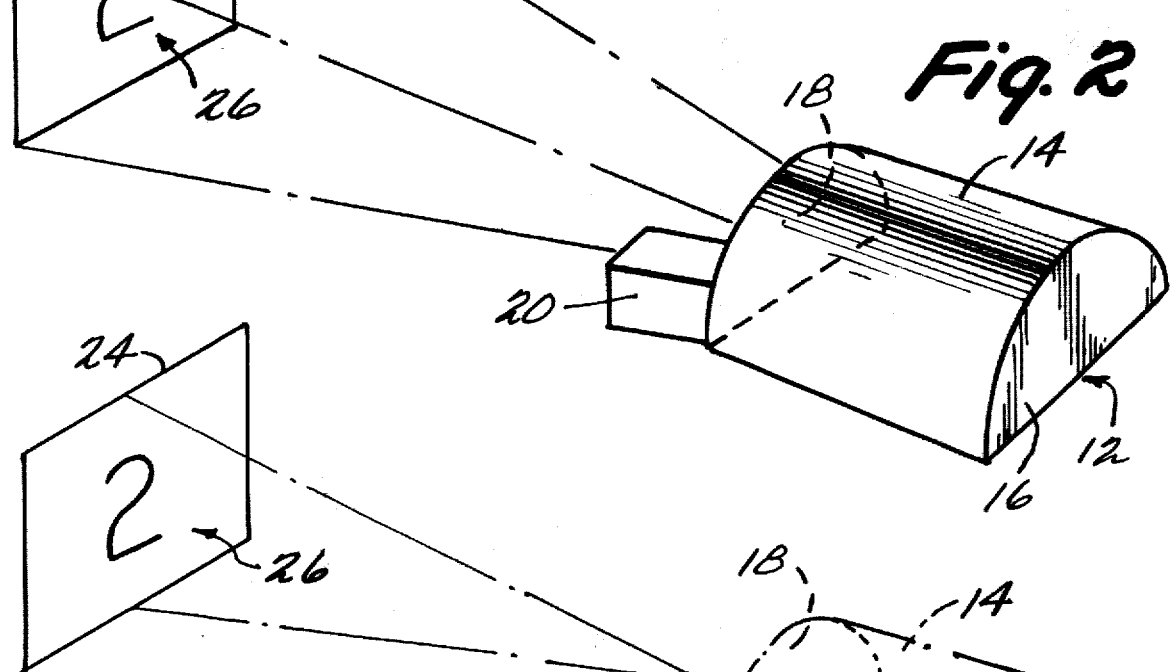
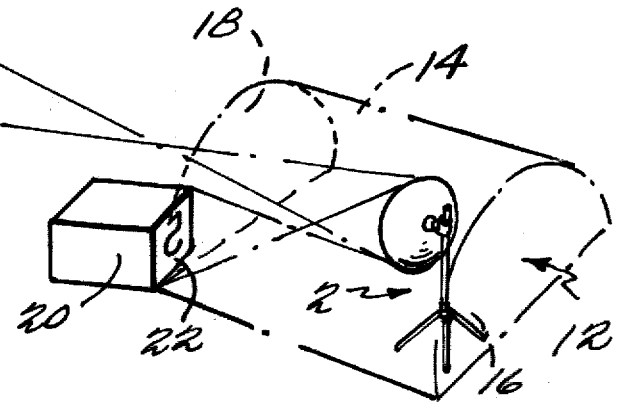

APPARATUS FOR PROJECTING ENLARGED VIDEO IMAGES

BACKGROUND OF THE INVENTION

This invention relates to an apparatus for enlarging and projecting the ordinary video image of a television set. In this regard, it is well known that it is sometimes difficult to see details of an image from an ordinary television set and that the number of people able to simultaneously view a single television set is limited.

Although a number of video image enlarging devices have already been proposed, the present invention is a significant improvement over such devices. For example, the apparatus described in U.S. Pat. No. 3,036,154 which was granted to Emil I. Harmon on May 22, 1976 has a functional drawback in that it requires the use of a relatively large and heavy internal battery for operation of the device. Furthermore, it does not project an enlarged image upon a display surface outside of the device. Therefore, difficulties in observing the details of the video image projected can be experienced, particularly for a large group. Finally, the image projected also has the further drawback of being the reverse of the actual video image.

Other prior art image enlarging devices utilize a complicated system of a series of mirrors (see, for example, U.S. Pat. No. 2,543,561 issued on Feb. 27, 1951 to Madison H. Tracy—column 3, lines 45-50) or the use of mirror and lens arrangements (see, for example, U.S. Pat. Nos. 4,021,104 granted to Stanley D. Schubach on May 3, 1977 and 3,820,995 which was issued on June 28, 1974 to Bennie S. Miller).

SUMMARY OF THE INVENTION

It is the principal object of this invention to provide a relatively inexpensive and easy-to-use apparatus which projects an enlarged image so as to allow the viewing of the details of the video image and to better permit the simultaneous viewing of the image by a large number of people.

It is a further objective of this invention to provide an apparatus for projecting enlarged video images which does not require a display surface disposed at a definite, unchangeable distance from the image enlarging means.

The present invention is an improved apparatus for projecting an enlarged video image. The apparatus has three main parts. The first is a television set which is adjusted so as to emit an inverted image. The second part is an enlarging apparatus which comprises a concave mirror which is directly in line with the screen of the television set. The mirror is capable of being adjusted horizontally and vertically as well as being placed at various distances from the television set, the proper distance from the set being dependent upon the size of the desired image. Such trial and error determinations of proper adjustment and positioning are well within the ordinary skills and experience of potential users of the present invention. The third portion of the device is a lightweight housing which is provided with an opening at one end. The television set is positioned at the bottom portion of the opening, and the inverted image from the set is projected via the concave mirror through the top portion of the opening onto a suitable display surface, such as a wall or a conventional projection screen.

It shall be understood that the detailed description hereinafter, while indicating a preferred embodiment of the invention, is given by way of illustration only, since various changes and modifications within the spirit and scope of the invention will become apparent as the description progresses.

BRIEF DESCRIPTION OF THE DRAWINGS

The invention will be described with reference to the accompanying drawings wherein:

FIG. 1 is a perspective view of a mirror arrangement constituting a portion of the present invention;

FIG. 2 is a perspective view of an assembly of components for projecting enlarged television images according to the present invention; and FIG. 3 is a perspective view of the asseembled unit shown in FIG. 2 with the housing illustrated in broken lines in order to illustrate the positioning of the mirror within the housing.

DETAILED DESCRIPTION OF THE INVENTION

Referring now to the drawings in detail, FIG. 1 shows an enlarging apparatus 2 comprising a support means 4, a concave mirror 6 joined to the support means by a suitable connection such as a ball joint 8 which permits swiveling or tilting the mirror both vertically and horizontally. A suitably sized mirror is one which is approximately 6" in diameter, and the concavity typically is parabolic. The enlarging apparatus 2 also includes additional means 10 for slidably adjusting the height of the miror 6. A suitable adjustment is a telescoping arrangement such as is used in varying the height of a display screen used to show home slides and movies. Of course, various other conventional support, swiveling and adjustment means 4, 8 and 10 also may be utilized.

FIGS. 2 and 3 illustrate a preformed unit 12 which houses the principal components for projecting the enlarged video image. The housing 12 is a lightweight unit formed from suitable materials such as plastic, wood, metal or even fabric (when secured to a frame). The housing may be of various dimensions and configurations—e.g., rectangular or inverted U-shaped.

In the preferred embodiment, the housing 12 is formed with a continuous curved top portion 14 and an end wall 16. Inasmuch as the housing is intended to rest on a solid surface such as a floor, table or the ground, no bottom is required. The end 18 of the housing opposite wall 16 is open for reasons to be detailed hereinafter. The interior surface of the housing is provided with a non-reflective black matte finish.

A television set 20 is positioned at the bottom portion of opening 18 and may be secured to the housing 12 by a suitable locking mechanism (not shown) which may comprise, for example, a wood or metal bar with attaching means at each end which engage the edge of top portion 14 which defines opening 18. If desired, the television set 20 may be inclined with respect to the surface on which the set and housing 12 rest.

The preferred manner of utilizing the present invention involves adjusting the video image 22 of the television set 20 so that it is inverted. The set 20 is separated from a display surface, such as screen 24, by a distance determined by the operator. Enlarging apparatus 2 is aligned with the video image of television set 20 and with screen 24. By adjustment of the height of said enlarging apparatus 2, the orientation of the concave mirror 6, and the distance of the enlarging apparatus 2 and the set 20 from the screen 24, a desired enlarged true image 26 is projected in an upright fashion onto the screen. After these adjustments and distances have been determined by trial and error, the television set 20 and enlarging apparatus 2 are enclosed in housing 12 such that the image reflected by mirror 6 passes through the upper portion of opening 18 in the housing. The television set 20 then is locked in place with respect to the housing as previously described. Housing 12 serves to protect the projected video image 22 from interference from light sources outside of the housing.

While the foregoing description has been limited to a two dimensional projection apparatus, it will be appreciated that the present invention also may be employed to project a three-dimensional image. This requires the use of plural enlarging apparatus 2 for reflecting respective components of image generated by the image source. Of course, viewing of the resultant image appearing on screen 24 would require conventional 3-D glasses in order for the viewer to obtain the three-dimensional affect.

What is claimed is:

1. Apparatus for projecting an enlarged video image onto a display surface, comprising:
   a television set adjusted to project an inverted image;
   a housing having an opening at one end thereof, said television set being located at a bottom portion of the opening and arranged such that the image faces the interior of the housing;
   a single optical element located within the housing for reflecting the projected image beyond said housing onto the display surface, said optical element comprising a concave parabolic mirror; and
   means for adjusting said mirror to reflect the image through a top portion of said opening onto the display surface.

2. Apparatus for projecting an enlarged video image onto a display surface, comprising:
   a television set adjusted to project an inverted image;
   a housing provided with a non-reflective black finish on its interior and having an opening at one of its ends; said television set being located at a bottom portion of the opening and arranged such that the image faces the interior of the housing;
   a single optical element located within the housing for reflecting the projected image beyond said housing onto the display surface, said optical element comprising a concave mirror; and
   means for adjusting said mirror to reflect the image through a top portion of said opening onto the display surface.

3. Apparatus as set forth in claim 2, wherein said housing unit has a generally inverted U-shape and comprises a continuous curved top portion and an end wall.

* * * * *